(12) United States Patent
Carstens

(10) Patent No.: US 8,504,390 B2
(45) Date of Patent: Aug. 6, 2013

(54) SYSTEM AND METHOD FOR PROVIDING VARIABLE INSURANCE COVERAGE

(75) Inventor: Michael Vincent Carstens, Omaha, NE (US)

(73) Assignee: Physicians Mutual Insurance Company, Omaha, NE (US)

( * ) Notice: Subject to any disclaimer, the term of this patent is extended or adjusted under 35 U.S.C. 154(b) by 949 days.

(21) Appl. No.: 12/245,478

(22) Filed: Oct. 3, 2008

(65) Prior Publication Data

US 2010/0088114 A1 Apr. 8, 2010

(51) Int. Cl.
*G06Q 50/00* (2012.01)
(52) U.S. Cl.
USPC ........................................ 705/3; 705/2; 705/4
(58) Field of Classification Search
USPC .................................... 705/2–4, 37
See application file for complete search history.

(56) References Cited

U.S. PATENT DOCUMENTS

| | | | | |
|---|---|---|---|---|
| 5,191,522 A | * | 3/1993 | Bosco et al. | 705/4 |
| 5,594,637 A | * | 1/1997 | Eisenberg et al. | 705/2 |
| 5,933,809 A | * | 8/1999 | Hunt et al. | 705/3 |
| 7,319,970 B1 | * | 1/2008 | Simone | 705/4 |
| 7,392,202 B1 | * | 6/2008 | O'Brien | 705/4 |
| 7,657,479 B2 | * | 2/2010 | Henley | 705/37 |
| 7,702,527 B1 | * | 4/2010 | Kron et al. | 705/4 |
| 8,032,396 B2 | * | 10/2011 | Klippel | 705/3 |
| 2004/0010426 A1 | * | 1/2004 | Berdou | 705/4 |
| 2008/0120143 A1 | * | 5/2008 | Beauregard et al. | 705/4 |

OTHER PUBLICATIONS

UniCare, Texas The Insurance Plan of Choice for Medicare Supplemental Coverage, PLN200101, Jun. 2006.*
Sanford Health Plan, Standard Medicare Supplement Insurance Policy Plan F High Deductible, SVHP-0307, Mar. 2004.*

* cited by examiner

*Primary Examiner* — Gerald J. O'Connor
*Assistant Examiner* — Teresa Woods
(74) *Attorney, Agent, or Firm* — Perkins Coie LLP

(57) ABSTRACT

A system and method provide supplemental insurance having a relatively high first deductible and relatively low first premiums when coverage begins. On the occurrence of a predetermined future event, such as a plan maturity date or other event, the first deductible decreases while maintaining a relatively low premium for the duration of the insurance plan for the policy owner. The policy owner may be provided with an option to elect, on a guaranteed basis, to reduce the first deductible amount to a lower deductible amount, in exchange for an increased premium amount, prior to the occurrence of the predetermined event. In some embodiments, the supplemental insurance is provided as a rider to a Medicare Supplement Plan F.

14 Claims, 7 Drawing Sheets

* These new elements can be removed at the policy owner's election, leaving a Standardized Plan F (no discount, no deductible)

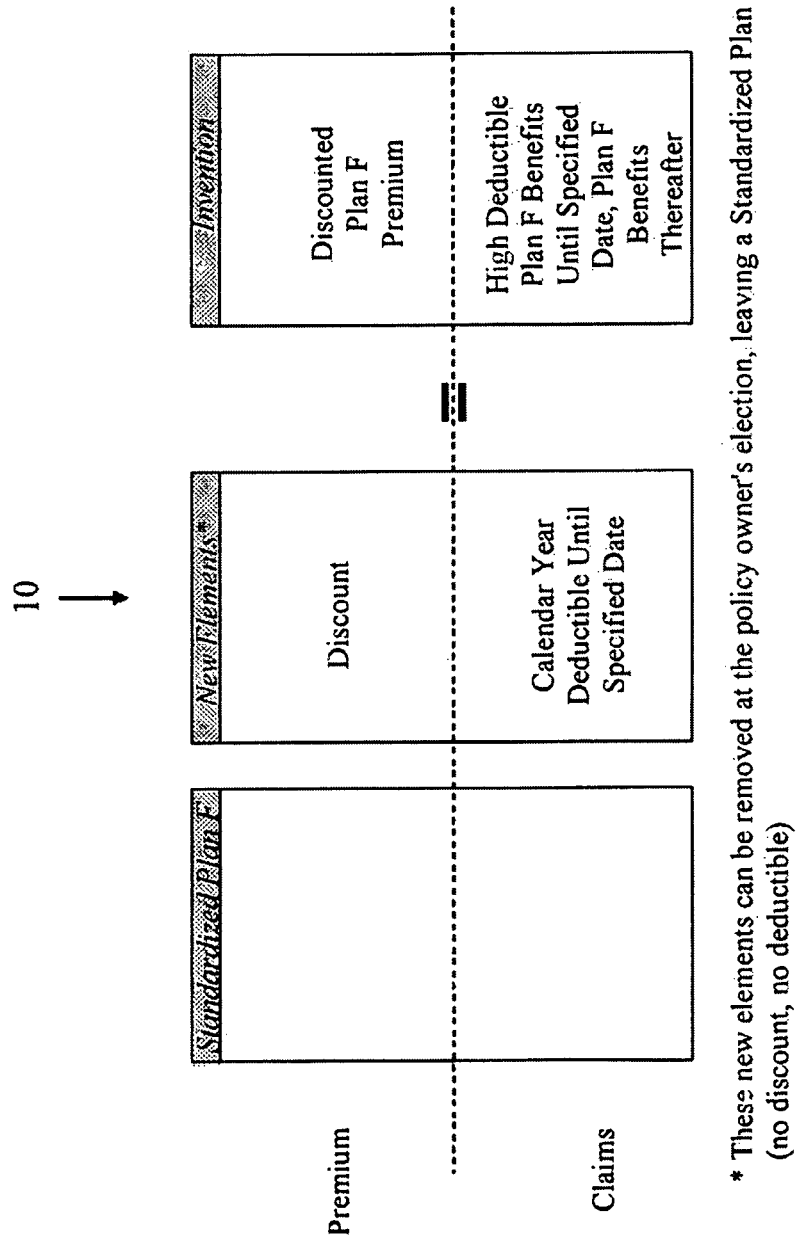

SYSTEM AND METHOD FOR PROVIDING VARIABLE INSURANCE COVERAGE

BACKGROUND

Medicare provides insurance coverage for health care services. However, Medicare typically covers only a portion of the total costs for such health care service. The uncovered costs that remain, also known as the "gap", must be paid by the patient. Accordingly, insurance companies have made Medicare Supplement insurance (Medigap) available to help fill the "gaps" in Medicare coverage. Medicare Supplement insurance can be found that pays for some or all of the Medicare gaps.

The National Association of Insurance Commissioners (NAIC) defined a set of different Medigap standardized plans, wherein each plan is separately defined as a specified combination of gaps it covers. One of these plans, Plan F, covers nearly all gaps in Medicare coverage. As depicted in FIG. 1, another plan, High Deductible Plan F, also covers nearly all gaps in Medicare coverage but only after the policy owner has paid an amount equal to the deductible in each calendar year. In 2008, the policy owner would have to pay for the first $1,900 in health care service costs incurred. Thereafter, the High Deductible Plan F would pay nearly all of the remaining Medicare gaps. While this type of supplemental insurance provides less coverage, in view of the deductible, the premium for the High Deductible Plan F is significantly less expensive than Plan F. However, with a High Deductible Plan F, the amount of the deductible increases each year and the amounts paid by the policy owner toward the deductible may fluctuate greatly from one year to the next. Therefore, the person's out-of-pocket expenses each year can be unpredictable. Accordingly, prospective policy owners have had to pick between the "lesser of evils" in determining the scope of their supplemental coverage.

Retirees tend to live on fixed incomes. Their main sources of income commonly include Social Security income, pension income, investment income and, in some cases employment income. To protect their fixed incomes, a Medigap policy is purchased to provide more predictable out-of-pocket expenses when heath care is necessary. As defined by the NAIC, the benefit level provided by a given Medigap plan remains fixed over time. However, a retiree's income and health needs may change: generally, income opportunities and health diminish as they age. In addition, purchase of a different Medigap plan at a later date may require the retiree to undergo underwriting to qualify and have a (higher) premium based on their (higher) age at that time. As a result, retirees have largely purchased the most comprehensive coverage available, regardless of their income or health.

Products available in the Medicare Supplement marketplace are standardized. Accordingly, price often becomes the sole driver when retirees make their purchasing decisions between one company's offering versus another's. On such a basis, lesser regard is given to a company's service levels, or how a purchaser's needs may change over time. While regulation allows for innovative benefits, few have been made available. Standardized plans allow for ease of comparison for shoppers and minimize confusion regarding the benefits provided. Any new benefit structures to improve product suitability would need to maintain the simplicity that standardization offers.

SUMMARY

This Summary is provided to introduce a simplified selection of some concepts that are further described below in the Detailed Description. This Summary and the Background are not intended to identify key aspects or essential aspects of the claimed subject matter. Moreover, this Summary is not intended for use as an aid in determining the scope of the claimed subject matter.

A Medicare Supplement and methods of employ are provided for use alone or in conjunction with one or more insurance plans, such as a Medicare plan. The Medicare Supplement may, for example, include a Medicare Supplement Plan F, alone or with a rider. Some embodiments of the Medicare Supplement combine attributes of various plans, including a relatively high deductible, such as typically exhibited by High Deductible Plan F policies, but premiums that may be somewhat higher than those commonly associated with such higher deductibles. In some embodiments, the premiums may be higher than, for example, a High Deductible Plan F policy, yet lower than a Plan F policy. On the occurrence of a predetermined future event, in various embodiments, the deductible decreases while maintaining a relatively low premium for the duration of the Medicare Supplement for the policy owner. Examples of predetermined future events include a plan maturity date, the decline in the physical or financial health of the policy owner, and the like. In many embodiments, the policy owner may elect to convert to the decreased deductible prior to the predetermined future event. In such instances, the Medicare Supplement may call for an increase in premiums. Some embodiments may associate the deductible amount and premium amount with those associated with a Plan F Policy.

In various embodiments, the additional premium sums paid over an initial period serve as a prefunding tool for one or more additional benefits or policy features for the policy owner, such as an option that enables the policy owner to elect to convert, on a guaranteed basis, to the decreased deductible prior to the predetermined future event. Such prefunding may also help pay, on the front end, for the planned low deductible and "discounted" premium that are put in place on the occurrence of the predetermined event.

Some embodiments of the Medicare Supplement are provided in the form of an otherwise common policy, such as a Plan F policy and an optional rider. According to particular embodiments of the Medicare Supplement, the rider may add a higher deductible, commensurate with a High Deductible Plan F policy, to the Plan F policy. The rider may further provide for a premium amount that is set at a first premium amount, which is higher than a standard High Deductible Plan F Policy but lower than a standard Plan F policy. A predetermined event is set by the rider. In some instances, the event is a maturation date, such as the fourth January $1^{st}$ after the policy's effective date. In some embodiments, the rider provides for at least two or more scenarios or conversion events. One scenario may provide for procedures that go into effect where the rider is kept in force until the occurrence of a predetermined event, in which case the premium remains at a "discounted" level while the deductible is lowered to a Plan F amount for the life of the plan. The second scenario may provide for an instance where the rider is terminated or otherwise dropped from the Medicare Supplement prior to the occurrence of a predetermined event. In such instances, the deductible may be lowered to Plan F levels, while the premium amounts are elevated to standard Plan F amounts for the life of the plan.

In other embodiments, the rider could provide for a gradual decline of the deductible amount over one or more periods of time, prior to the occurrence of the predetermined event or an election by the policy holder. This could be accomplished in one or more steps of equal or varying amounts. In other alternative embodiments, a rider could be added to a High Deductible Plan F that increases premium amounts and eliminates the deductible upon the occurrence of a future event. Likewise, the deductible could be gradually phased out over two or more separate points prior to the occurrence of the predetermined event as described previously in other embodiments. In still other embodiments, irrespective of the type of base policy, the rider could be eliminated and the features, benefits, and options described previously could be provided within the language of the base policy.

In various embodiments, one or more computing devices may be provided on which one or more embodiments of the Medicare Supplement may be at least partially implemented or supported. The computing device(s) may be provided with basic data information that may include data relating to the terms of the Medicare Supplement, such as an initial or first deductible amount, initial or first premium amount, one or more later occurring or second deductible amount(s), a potentially later occurring or second premium amount, and the identity of one or more predetermined event(s). Other data may include the policy owner identity and contact information, one or more actuarial tables and or predictive models. Such data may enable the computing device(s) to provide a wide array of functions relative to the Medicare Supplement. For example, one or more application programs may be provided for tracking events, such as premium payments, and notices sent to or received from the policy owner. Other application programs may be provided for tracking predetermined events and notices of their occurrence. Still other application programs may be provided for determining the availability of benefits under the Medicare Supplement.

Other embodiments may provide the computing device with application programs that enable communication and reporting with and between one or more policy owners and the insurance provider or its associates over one or more of a variety of networks. Such communications may include the receipt and provision of notices relative to deadlines, determination of benefits, occurrence of predetermined events and elections, and the like. Sample data including projected costs, premiums, deductible amounts and other benefits may be calculated and relayed as well. The computing device(s) may also include a user interface to enable one or more insurance provider representative(s) to administer the Medicare Supplement and its provisions.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 3 is a pictorial representation of one manner in which an existing Plan F can be modified to provide an embodiment of the Medicare Supplement.

Figure 4A:
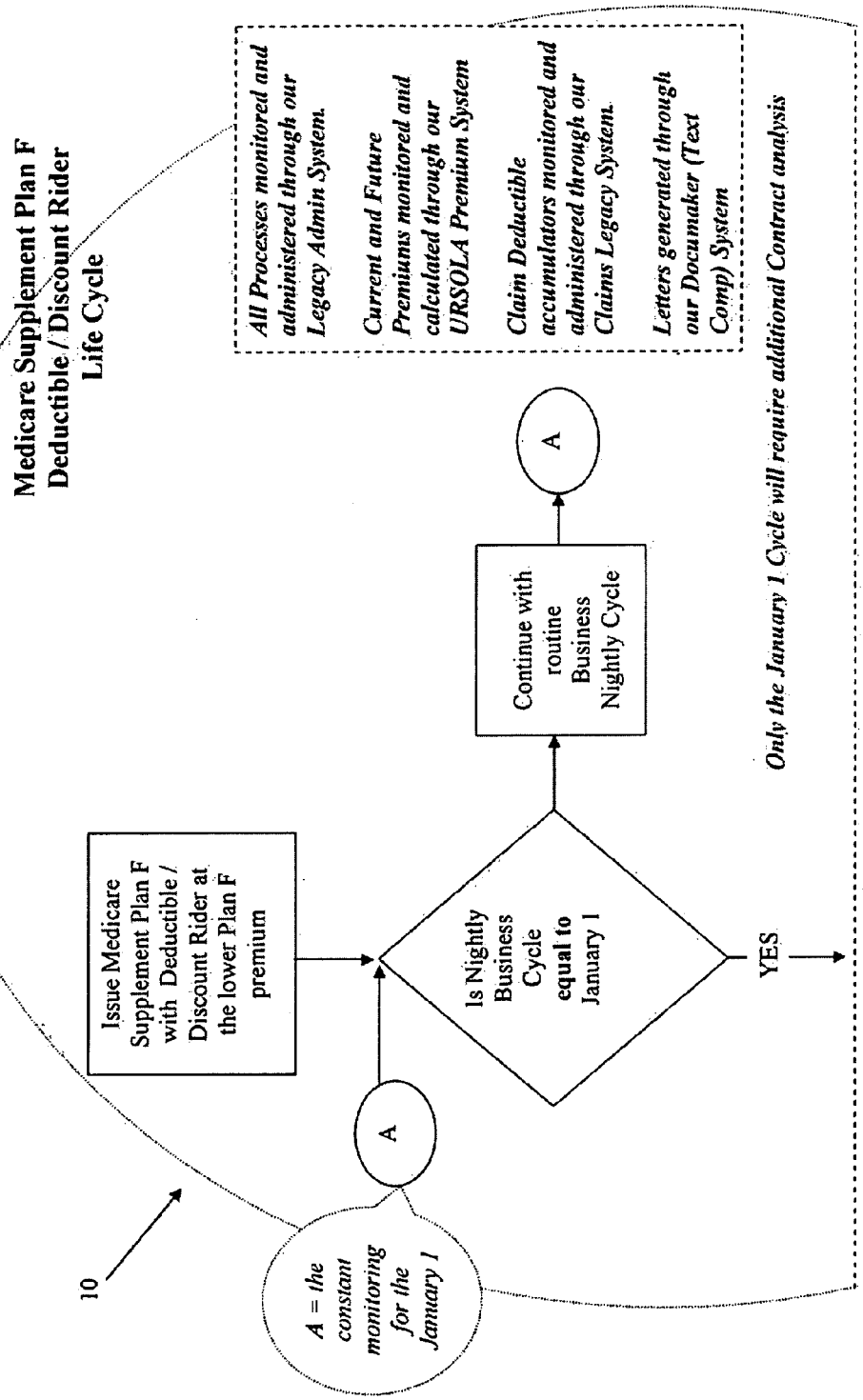
Figure 4B:
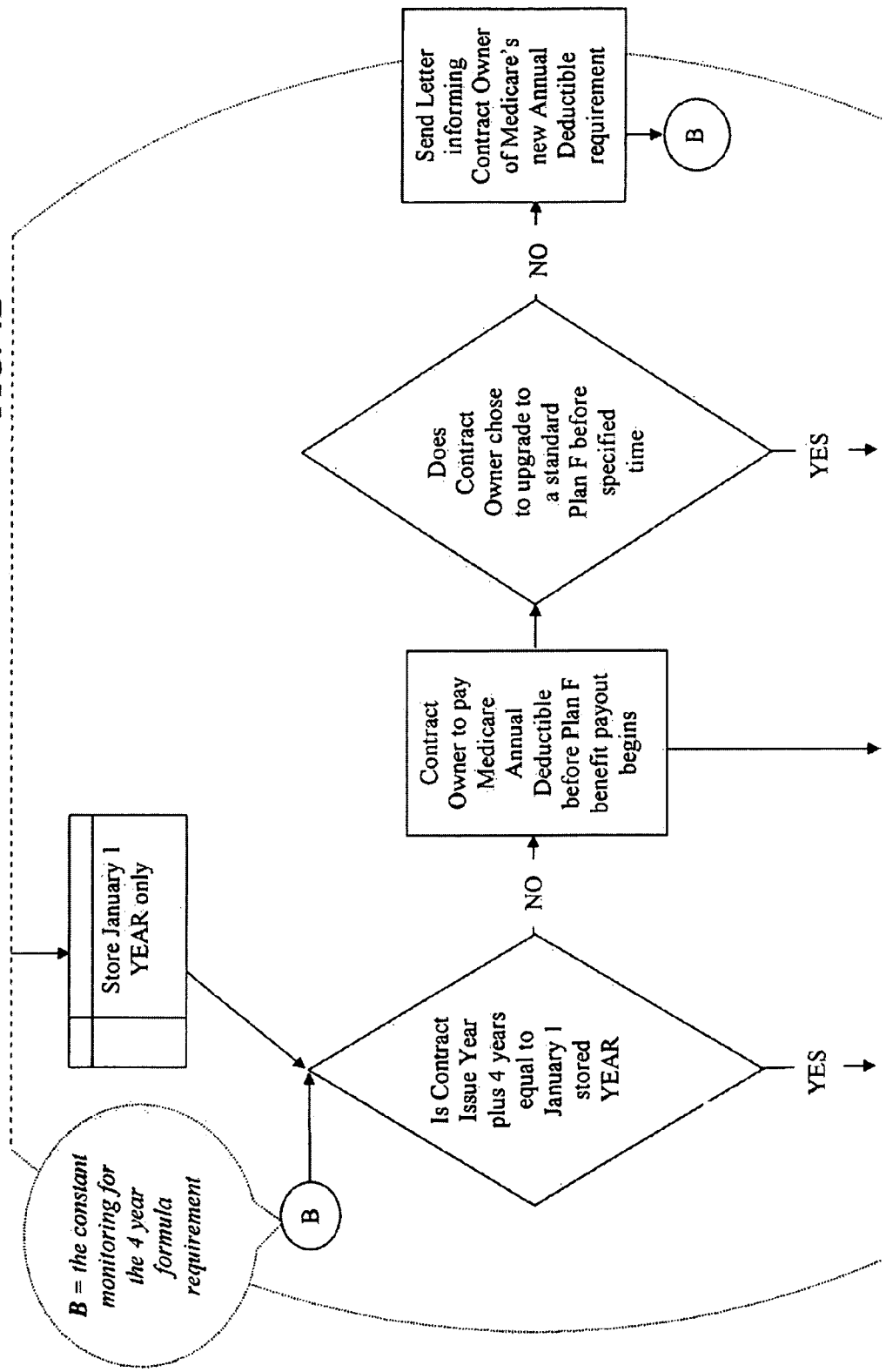
Figure 4C:
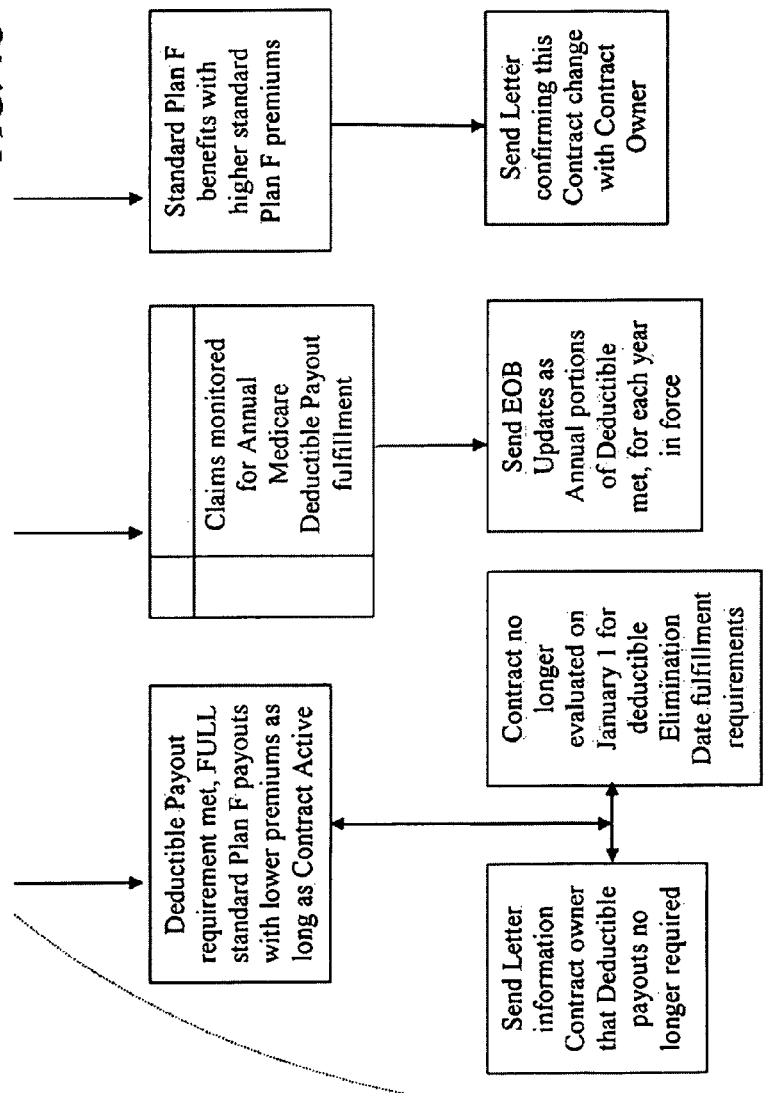

FIG. 4A, FIG. 4B, and FIG. 4C together, depict a flow diagram of one embodiment of an initial life cycle of the Medicare Supplement.

Figure 5:
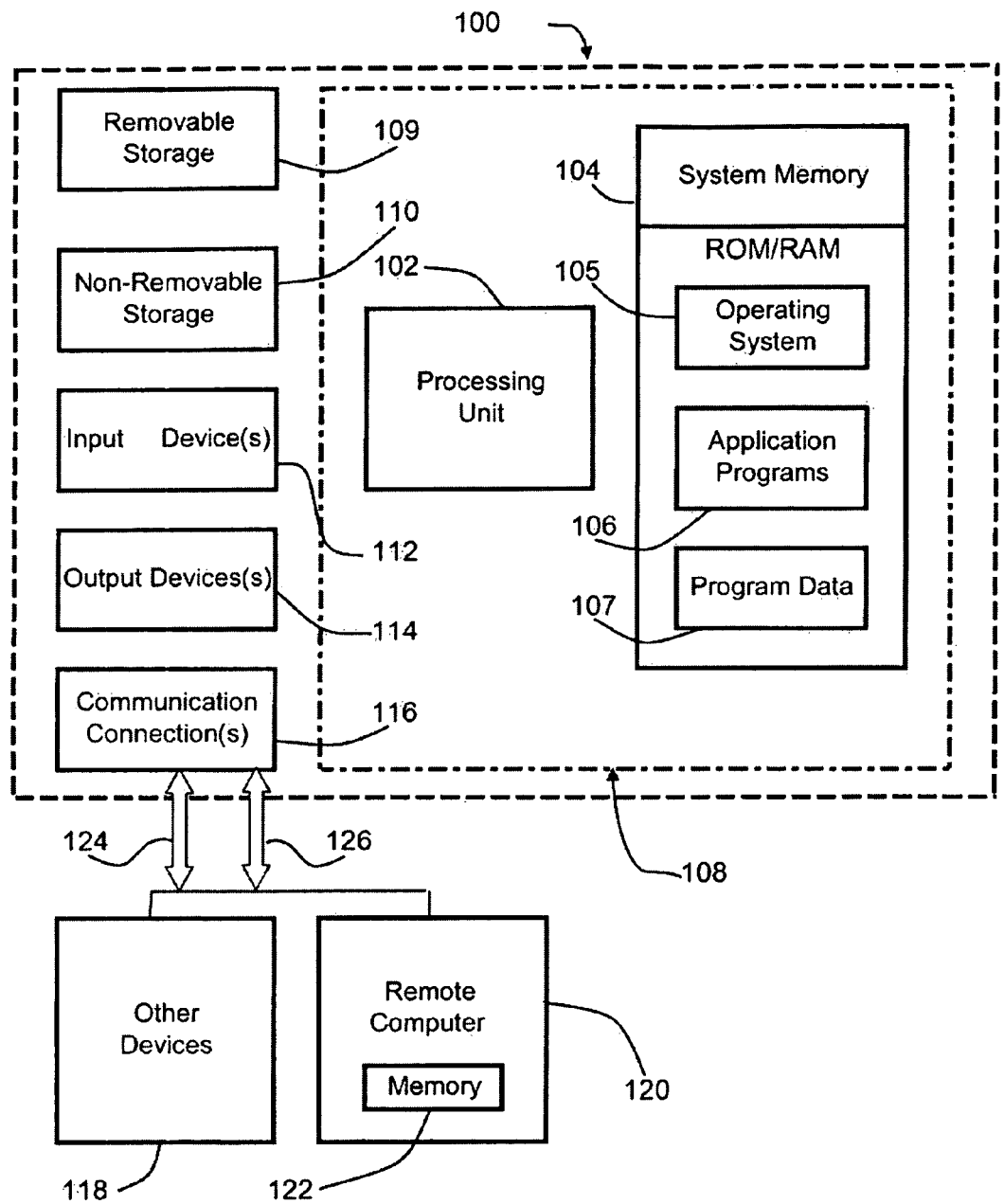

FIG. 5 depicts a general process diagram of one embodiment of a method for providing variable, supplemental insurance coverage.

DETAILED DESCRIPTION

Embodiments are described more fully below with reference to the accompanying figures, which form a part hereof and show by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

In various embodiments, a Medicare Supplement 10 is offered for use in conjunction with Medicare coverage. In some embodiments, the Medicare Supplement 10 includes a Medicare Supplement Plan F. Other embodiments may include a Medicare Supplement High Deductible Plan F. While the examples provided herein relate to particular aspects of certain Medicare Supplement plans, it is contemplated that the Medicare Supplement could be associated with other aspects of Medicare Supplements used currently in the industry and developed hereafter. Accordingly, the following descriptions are for exemplary purposes only.

Embodiments of the supplemental insurance combine attributes such as a relatively high deductible, such as typically exhibited by High Deductible Plan F policies, but premiums that may be somewhat higher than those commonly associated with such higher deductibles. In some embodiments, the premiums may be higher than, for example, a High Deductible Plan F policy, yet lower than a Plan F policy. On the occurrence of a predetermined future event, the deductible decreases while maintaining such "discounted" premiums for the duration of the Medicare Supplement for the policy owner. In some embodiments, the predetermined future event may be a plan maturity date. In other embodiments, the predetermined future event may include a decline in the physical or financial health of the policy owner. In many embodiments, the policy owner may elect to convert to the decreased deductible prior to the predetermined future event. In such instances, the Medicare Supplement 10 may call for an increase in premiums. Some embodiments may associate the deductible amount and premium amount with those associated with a Plan F Policy.

It can, therefore, be seen that, in various embodiments, the Medicare Supplement may effectively require the policy owner to pay "extra premiums" for a period of time in view of the contemporaneously higher deductible and premiums. In some embodiments, the additional premium payments may be thought of as prefunding one or more additional benefits or policy features for the policy owner. In at least one embodiment, the Medicare Supplement 10 may provide the policy owner with an option to elect, on a guaranteed basis, to reduce the deductible amount, in exchange for an increase in premium amount, even if the predetermined event has not occurred.

Such "prefunding" may also help pay, on the front end, for the planned low deductible and "discounted" premium that is put in place on the occurrence of the predetermined event.

With prior Medicare Supplements, expenses related to marketing, processing, and activating coverage along with the expense of the coverage itself typically results in a financial loss in the year a policy is issued, according to Statutory Accounting Principles. However, with the Medicare Supplement 10, until the occurrence of a future event, claims loss ratios will tend to be lower than typical Medicare Supplement products. This is caused, at least in part, by a premium rate that is higher than that of a High Deductible Plan F while the claims are the same as with a High Deductible Plan F. As a result, more premium dollars are available to pay for the expenses associated with marketing which results in a lower loss in the year of issue.

The Medicare Supplement 10, in various embodiments, has the long view clearly in focus at the time of sale. The product design sets the expectation with the policy owner that the policy owner will maintain the policy for a number of years. After the policy converts to full Plan F benefits at a discounted premium level, the price of the product will be more competitive than standard Plan F policies in the marketplace. These and other factors may help to create higher than expected persistency. This higher persistency may translate into greater overall value to the issuing company.

In various embodiments of the Medicare Supplement 10, the plan may be provided in the form of an otherwise common policy, such as a Plan F policy. The provider may then include within the Medicare Supplement 10 an optional rider. In some embodiments, the rider provides for at least two scenarios or conversion events. The first scenario may provide for procedures that go into effect where the rider is kept in force until the occurrence of a predetermined event, such as a maturation date following the policy's effective date. The second scenario may provide for a fact scenario where the rider is terminated or otherwise dropped from the Medicare Supplement 10 prior to the occurrence of a predetermined event.

According to particular embodiments of the Medicare Supplement 10, the rider adds a higher deductible, at a first deductible amount commensurate with a High Deductible Plan F policy, to the Plan F policy. In 2008, the deductible amount for High Deductible Plan F policies is set by law at $1,900. Accordingly, some embodiments of the Medicare Supplement will provide for a first deductible amount of $1,900. However, that amount may vary over time. Accordingly, for various embodiments of the Medicare Supplement, "first deductible amount" will be equal to the deductible amount for High Deductible Plan F policies, as determined by law at any given time. The rider further calls for a premium amount that is set at a first premium amount, which is higher than premiums associated with a standard High Deductible Plan F Policy but lower than those associated with a standard Plan F policy. Premiums for various insurance products throughout the insurance industry commonly increase over time for various reasons. Accordingly, "first premium amount" should be construed as the initial premium rate set for the Medicare Supplement 10 at the time of its issuance but will further include any commonly occurring fluctuations in premiums over time. A predetermined event is set by the rider as being a maturation date. In the present example, the maturation date is the fourth January $1^{st}$ after the policy's effective date. Accordingly, while the base policy is a Plan F, the benefits are paid the same as a High Deductible Plan F until the fourth January $1^{st}$ after the effective date.

Exemplary Scenario 1:

Rider is retained until the predetermined event after the policy's effective date.

The policy owner maintains the Medicare Supplement 10 in which the deductible is higher than that of a Plan F for a number of years after the policy's effective date. In return, the policy owner pays premiums at first premium amounts that are lower than those of a Plan F. If the rider remains in force until the fourth January $1^{st}$ after the policy's effective date, Medicare Supplement 10 reduces the deductible amount to a second deductible amount that is commensurate with a Plan F. Plan F policies currently have no deductible. As such, various embodiments of the Medicare Supplement 10 will have a zero deductible or no deductible. It is conceivable, however, that regulations governing Plan F policies could change. Accordingly, for various embodiments of the Medicare Supplement, "second deductible amount" will be equal to the deductible amount for Plan F policies, as determined by law at any given time. It is further contemplated that the second deductible amount could be provided at an amount between the amounts typically associated with High Deductible Plan F policies and Plan F Policies at any time during the maintenance of the Medicare Supplement. However, it is intended that the second deductible amount will be construed as defined herein and allowable under relevant laws and or regulations where the Medicare Supplement 10 is offered, used or sold. In various embodiments, however, the premiums will remain at the "first premium amount." This conversion to higher benefits happens automatically on a guaranteed basis. Accordingly, in many embodiments, the policy owner does not have to qualify based on their health or age. This may provide an important benefit over other Medicare Supplements which do not provide for ongoing Plan F premiums that are based on the policy owner's original issue age. As such, the policy owner "saves age" over time.

Exemplary Scenario 2:

Rider is dropped prior to the occurrence of the predetermined event after the policy's effective date.

From the effective date of the policy, the rider provides benefits in accordance with the deductible and premium amounts as described in Scenario 1. However, the rider enables the policy owner to drop the rider at the policy owner's election at any time prior to the maturation date (the fourth January $1^{st}$ after the policy's effective date). It is contemplated that one scenario in which the policy might make the election involves the policy owner's serious decline in health. Such an instance may make the policy owner want to switch to a lower deductible amount due to increasing heath care services and their associated medical expenses. In the present example, the policy owner is at a greater advantage than those who own High Deductible Plan F policies as the right to convert to the lower deductible (the "second deductible amount") at any time prior to the fourth January $1^{st}$ is guaranteed. The only immediate downside for the policy owner in this example is that the premium discount no longer applies and the premiums would be charged at a "second premium amount" for the duration of the Medicare Supplement 10. In various embodiments, the "second premium amount" will be equal to premiums associated with Plan F policies at the time of conversion.

In various alternate embodiments, it is contemplated that the Medicare Supplement 10 may not provide for a policy owner election to convert the plan prior to the occurrence of the predetermined event. As a result, the lower initial benefits may discourage some purchasers that are more risk averse. Different Medigap benefits could be used before and after the predetermined event. This could be an upgrade or downgrade conversion and could include standardized or non-standardized Medigap benefit packages used now or in the future in the industry.

Embodiments of the Medicare Supplement 10 provide High Deductible Plan F benefits for a period of time, and Plan F benefits thereafter. In some embodiments, however, the structure could be changed to provide some other coverage initially, and some alternative coverage thereafter. The two current benefits are both equivalent to NAIC-defined standardized Medigap plans. Instead, one or both benefits could be provided as benefits that are not currently defined in the NAIC Model. For example, states such as Wisconsin, Massachusetts, and Minnesota are not currently standardized in the same way as the rest of the states. Wisconsin defines all of the gaps and benefits than can be available, and an insurer can offer them a la carte. The prospective policy owner simply purchases the desired gaps, which is frequently accomplished with various riders that represent coverage for the various gaps in Medicare.

In other embodiments; the rider could provide for a gradual decline of the deductible amount over one or more periods of time, prior to the occurrence of the predetermined event or an election by the policy holder. For example, the rider could provide for a reduction in the initial deductible amount at some intermediate time between the policy's effective date and the predetermined event. Similarly, the rider could provide for two or more separate deductible reductions prior to the predetermined event, whereby the deductibles decrease in amount in successive order, effectively providing greater coverage with each decrease, to the extent allowed by the relevant laws and regulations where the Medicare Supplement 10 is offered, used or sold. In one particular embodiment, the deductible could begin a first amount at a plan effective date and decrease to 75% at commencement of the second calendar year, 50% at commencement of the third calendar year, 25% at commencement of the fourth calendar year, and finally 0% (Plan F deductible) at the end of the fourth calendar year or maturation of the plan.

In aforedescribed embodiments, the Medicare Supplement 10 includes a rider attached to a Plan F that reduces the premium amounts and adds an increased deductible until the occurrence of a future event. Alternatively, a rider could be added to a High Deductible Plan F that increases premium amounts and reduces the deductible upon the occurrence of a future event. Likewise, the deductible could be gradually phased out over two or more separate points prior to the occurrence of the predetermined event as described previously in other embodiments. In still other embodiments, irrespective of the type of base policy, the rider could be eliminated and the features, benefits, and options described previously could be provided within the language of the base policy.

With reference to FIG. 5, an example of a suitable computing system environment is illustrated in the form of a computing device 100 on which one or more various embodiments of the Medicare Supplement 10 may be at least partially implemented or supported. The computing device 100 is only one example of a suitable computing environment and is not intended to suggest any limitation as to the scope of use or functionality of the present Medicare Supplement. Other general purpose or special purpose computing system environments or configurations may be used in offering, implementing, managing, and monitoring the Medicare Supplement 10. Examples of well known computing systems, environments, and/or configurations that may be utilized include, but are not limited to, personal computers, server computers, network PCs, minicomputers, mainframe computers, distributed computing environments that include any of the above systems or devices, and the like.

In offering, implementing, managing and monitoring the Medicare Supplement 10, one or more computer-executable instructions, such as program modules, being executed by a computing device may be implemented. Generally, program modules include routines, programs, objects, components, data structures, etc. that perform particular tasks or implement particular abstract data types. The Medicare Supplement 10 may also be supported, at least in part, within distributed computing environments in which tasks are performed by remote processing devices that are linked through a communications network. In a distributed computing environment, program modules may be located in both local and remote computer storage media, including memory storage devices.

Referring to FIG. 5, an exemplary system includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more application programs 106, and may include program data 107. Examples of application programs 106 include interactive voice response (IVR) programs, phone dialer programs, dual-tone multi-frequency (DTMF) recognition programs, speech recognition programs, text-to-speech programs, e-mail programs, external interface programs, scheduling programs, PIM (personal information management) programs, database programs, word processing programs, spreadsheet programs, Internet browser programs, and so forth. This basic configuration is illustrated in FIG. 5 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 5 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication capability 116 that allows the device to communicate with other devices 118 (such as printing devices, stand alone e-mail servers, facsimile devices, and the like), such as over a network or a wireless mesh network. Communication media can be transmitted through the communication capability 116 and can include computer readable instructions, data structures, program modules or other data in a modulated data signal such as a carrier wave or other transport mechanism.

Figure 1:
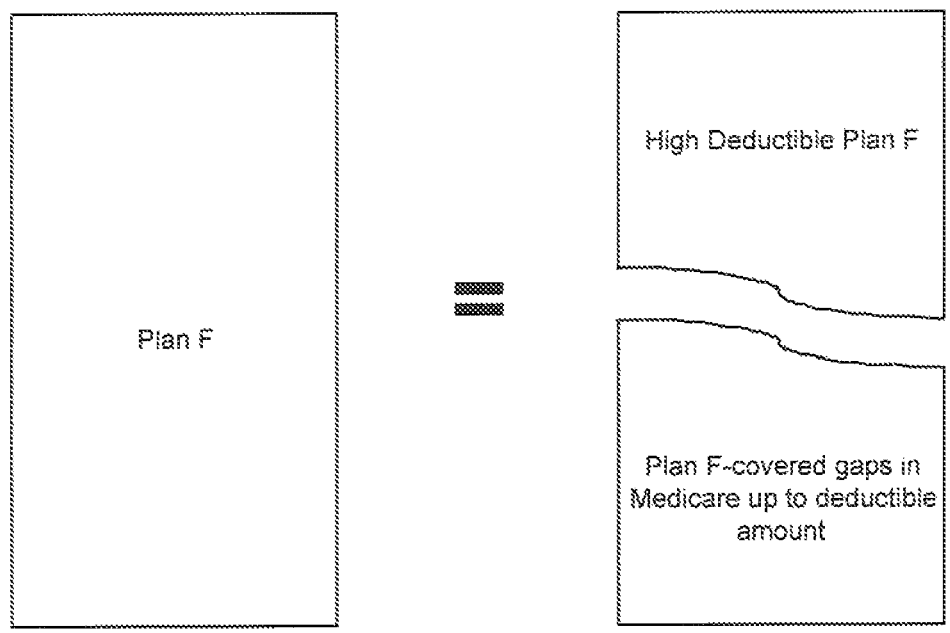
FIG. 1 is a pictorial comparison to existing Plan F and High Deductible Plan F policies.
Figure 2:
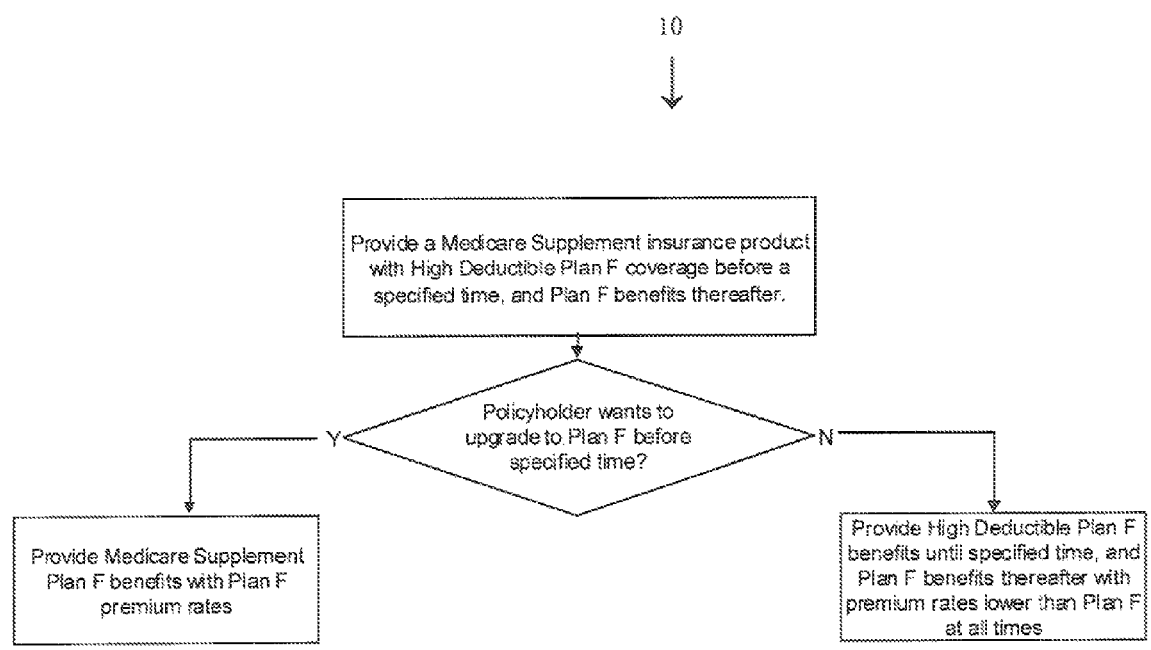
FIG. 2 is a flow diagram of one embodiment of the Medicare Supplement and depicts possible results that stem from a policy owner election prior to the occurrence of a predetermined event.

The computing device 100 may operate in a networked environment using logical connections to one or more remote computers, such as a remote computer 120. The remote computer 120 may be operated by a client, consumer or third-party service provider (including one or more providers of various information databases, research tools, reporting services, and the like); may take the form of a personal computer, a server, a router, a network PC, PDA, a peer device, or other common network node; and typically includes many or all of the elements described above relative to the computing device 100. It is further contemplated, however, that the remote computer 120 could be provided in the form of a telephone, which includes cellular telephones, landline telephones and the like. The logical connections, depicted in FIG. 1, include a local area network (LAN) 124 and a wide area network (WAN) 126, but may also include other proprietary and non-proprietary networks 128, such as wireless networks, a PSTN, the Internet, an intranet, extranet, and the like. It will be appreciated, however, that the network connections shown are exemplary and other networking and communications means may be used. FIG. 5 illustrates an example of a suitable system environment on which the present Medicare Supplement 10 may be supported or implemented.

In some embodiments, the computing device 100 will be provided with basic data information from a user who is remotely or locally located with respect to the computing device 100. The data may include the data relating to the terms of the Medicare Supplement 10, which may include either or both of a base policy and rider. Many embodiments will further provide data information relative to particular aspects of the Medicare Supplement 10, such as an initial or first deductible amount, initial or first premium amount, one or more later occurring or second deductible amount(s), a potentially later occurring or second premium amount, and the identity of one or more predetermined event(s). Other data may include the policy owner identity and contact information, one or more actuarial tables and or predictive models. Accordingly, such data will enable the computing device 100 to provide a wide array of functions relative to the Medicare Supplement 10.

In various embodiments, one or more application programs 106 may be provided for tracking events, such as premium payments, and notices sent to or received from the policy owner. Other application programs 106 may be provided for tracking predetermined events and notices of their occurrence. Still other application programs may be provided for determining the availability of benefits under the Medicare Supplement 10.

The computing device 100 may be provided with application programs 106 that enable communication and reporting with and between one or more policy owners and the insurance provider or its associates over any of the previously described networks. Such communications may include the receipt and provision of notices relative to deadlines, determination of benefits, occurrence of predetermined events and elections, and the like. Sample data including projected costs, premiums, deductible amounts and other benefits may be calculated and relayed as well. Other application programs 106 may include a processor or other computer readable medium associated with a premium calculator, a benefit calculator, a beneficiary database, a benefits database, a triggering and conversion events database, and an actuarial database. The computing device 100 may further include a user interface to enable one or more insurance provider representative(s) to administer the Medicare Supplement 10 and its provisions in accordance with the processes and methodology described herein.

In some embodiments, the computer device 100 may be provided to assist or otherwise determine underwriting status prior to commencement of the Medicare Supplement 10. In at least one embodiment, a health status questionnaire may be provided to one or more prospective policy owners as part of the application process. Such health status questionnaires may be provided as a hard copy health insurance application, or an electronic questionnaire provided over one of the previously described networks between the computing device 100 and a device (as described previously) relative to and operated by a prospective policy owner. The health status questionnaire may be provided to collecting one or more elements of information that could include the prospective policy owner's address, age, sex, current health status, past health history, and health risk factors such as smoking habits, family health history, dangerous activities engaged in by the prospective policy owner, and the like. Once collected, the information may be used to determine premium amounts, deductible amounts, and the specific details of any predetermined event, such as predetermined time frame or policy owner health event.

Although the Medicare Supplement 10 has been described in language that is specific to certain processes and methodological steps, and, it is to be understood that the invention defined in the appended claims is not necessarily limited to the specific processes, and/or methodological steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein.

What is claimed is:

1. A computer implemented method for enabling a policy holder of an insurance supplement to vary provisions of the insurance supplement, the method comprising:
   at least temporarily storing on a data storage medium data relative to an insurance supplement that includes:
   (i) a deductible provision, set at a first deductible amount;
   (ii) a premium provision, set at a first premium amount;
   (iii) a first conversion provision that reduces the first deductible amount to a second deductible amount on the occurrence of one of the following predefined events that may occur after insurance coverage under the insurance supplement begins: (a) the policy holder attaining a predetermined age; amount of time; or (b) a decline in the physical health of the policy holder; and
   (iv) a second conversion provision that reduces the first deductible amount to the second deductible amount and increases the first premium amount to a second premium amount after the election by the policy holder; wherein an election of the second conversion provision by the policy holder terminates the first conversion provision; selling the insurance supplement to the policy holder;

receiving premiums in accordance with the insurance supplement;

receiving a notice that at least one of the predefined events occurred to trigger the first conversion provision;

computing a reduction of, and thereafter reducing, the first deductible amount to the second deductible amount with a computing device associated with the data storage medium.

2. The computer implemented method according to claim 1, further comprising:

defining the deductible provision, premium provision, first conversion provision, and second conversion provision within a rider; and associating the rider with the insurance supplement.

3. The computer implemented method according to claim 1, further comprising:

not increasing the first premium amount on the occurrence of at least one of the predefined events.

4. A system for enabling a policy holder of an insurance supplement to vary provisions of the insurance supplement, the system comprising:

a data storage medium at least temporarily storing data relative to the insurance supplement; wherein the insurance supplement includes: (i) a deductible provision, set at a first deductible amount; (ii) a premium provision, set at a first premium amount; (iii) a first conversion provision that reduces the first deductible amount to a second deductible amount on the occurrence of one of the following predefined events that may occur after insurance coverage under the insurance supplement begins: (a) the policy holder attaining a predefined age; or (b) a decline in the physical health of the policy holder; and (iv) a second conversion provision that reduces the first deductible amount to the second deductible amount and increases the first premium amount to a second premium amount on the election of the policy holder; wherein an election of the second conversion provision by the policy holder terminates the first conversion provision; the data including at least the insurance supplement (i) first deductible amount, (ii) first premium amount, (iii) second deductible amount, (iv) second premium amount, and (v) the identities of the predefined events;

computing a reduction of and thereafter reducing, the first deductible amount to the second deductible amount with a computing device associated with the data storage medium at least one computer readable medium operatively coupled with said data storage medium; said at least one computer readable medium comprising:

(a) software configured to receive notice that at least one of the predefined events occurred to trigger the first conversion provision;

(b) software configured to compute a reduction of, and thereafter reduce, the first deductible amount to the second deductible amount on the occurrence of at least one of the predefined events.

5. The system according to claim 4 wherein the insurance supplement includes a rider that defines the deductible provision, premium provision, first conversion provision, and second conversion.

6. The system according to claim 4 wherein said at least one computer readable medium further comprises software configured to not increase the first premium amount on the occurrence of at least one of the predefined events without notice that the policy holder has made the election.

7. A computer implemented method for enabling a policy holder of an insurance supplement to vary provisions of the insurance supplement, the method comprising:

at least temporarily storing on a data storage medium data relative to the insurance supplement that includes:

(i) a deductible provision, set at a first deductible amount;

(ii) a premium provision, set at a first premium amount;

(iii) a first conversion provision that reduces the first deductible amount to a second deductible amount on the occurrence of one of the following predefined events: (a) the policy holder attaining a predetermined age; or (b) a decline in the physical health of the policy holder; and (iv) a second conversion provision that reduces the first deductible amount to the second deductible amount and increases the first premium amount to a second premium amount on the election of the policy holder; wherein an election of the second conversion provision by the policy holder terminates the first conversion provision;

selling the insurance supplement to the policy holder;

receiving premiums in accordance with the insurance supplement;

receiving an election by the policy holder to enact the second conversion provision;

computing a reduction of and thereafter reducing, the first deductible amount to the second deductible amount, with a computing device associated with the data storage medium, and computing an increase of, and thereafter increasing, the first premium amount to the second premium amount with the computing device.

8. A computer implemented method for enabling a policy holder of an insurance supplement to vary provisions of the insurance supplement, the method comprising:

at least temporarily storing on a data storage medium data relative to the insurance supplement that includes:

(i) a deductible provision, set at a first deductible amount;

(ii) a premium provision, set at a first premium amount;

(iii) a first conversion provision that reduces the first deductible amount to an intermediate deductible amount on the occurrence of one of the following predefined events that may occur after insurance coverage under the insurance supplement begins: (a) the policy holder attaining a predetermined age; or (b) a decline in the physical health of the policy holder; and (iv) a second conversion provision that reduces the first deductible amount to the second deductible amount and increases the first premium amount to a second premium amount on the election of the policy holder; wherein an election of the second conversion provision by the policy holder terminates the first conversion provision;

selling the insurance supplement to the policy holder;

receiving premiums in accordance with the insurance supplement;

determining that: (i) at least one of the predefined events have occurred; and (ii) the policy holder has not elected the second conversion provision;

computing a reduction of and thereafter reducing, the first deductible amount to the intermediate deductible amount with the computing device associated with the data storage medium.

9. The computer implemented method according to claim 8, wherein:

the first conversion provision reduces the first deductible amount to a plurality of successive intermediate deductible amounts after the occurrence of one of the predefined events; the plurality of intermediate deductible amounts each decreasing in amount in successive order; and the step of reducing the first deductible amount includes reducing the first deductible to the plurality of intermediate deductible amounts in a plurality of separate steps after the passage of the occurrence of one of the predefined events.

10. A system for enabling a policy holder of an insurance supplement to vary provisions of the insurance supplement, the system comprising:
   a data storage medium at least temporarily storing data relative to the insurance supplement; wherein the insurance supplement includes:
      (i) a deductible provision, set at a first deductible amount;
      (ii) a premium provision, set at a first premium amount;
      (iii) a first conversion provision that reduces the first deductible amount to a second deductible amount on the occurrence of one of the following predefined events that may occur after insurance coverage under the insurance supplement begins: (a) the policy holder attaining a predetermined age; or (b) a decline in the physical health of the policy holder; and
      (iv) a second conversion provision that reduces the first deductible amount to the second deductible amount and increases the first premium amount to a second premium amount on the election of the policy holder; wherein an election of the second conversion provision by the policy holder terminates the first conversion provision;
   the data including at least the insurance supplement (i) first deductible amount, (ii) first premium amount, (iii) second deductible amount, (iv) second premium amount, and (v) the identities of the predefined events;
   at least one computer readable medium operatively coupled with said data storage medium; said at least one computer readable medium comprising:
      a) software configured to receive notice that the policy holder has made the election to trigger the second conversion provision;
      b) software configured to compute a reduction of and thereafter reduce, the first deductible amount to the second deductible amount and compute an increase of and thereafter increase, the first premium amount to the second premium amount.

11. A system for enabling a policy holder of an insurance supplement to vary provisions of the insurance supplement, the system comprising:
   a data storage medium at least temporarily storing data relative to the insurance supplement; wherein the insurance supplement includes:
      (i) a deductible provision, set at a first deductible amount;
      (ii) a premium provision, set at a first premium amount;
      (iii) a first conversion provision that reduces the first deductible amount to an intermediate deductible amount on the occurrence of one of the following predefined events that may occur after insurance coverage under the insurance supplement begins: (a) the policy holder attaining a predetermined age; or (b) a decline in the physical health of the policy holder; and
      (iv) a second conversion provision that reduces the first deductible amount to the second deductible amount and increases the first premium amount to a second premium amount on the election of the policy holder; wherein an election of the second conversion provision by the policy holder terminates the first conversion provision; and
   the data including at least the insurance supplement (i) first deductible amount, (ii) first premium amount, (iii) second deductible amount, (iv) second premium amount, and (v) the identities of the predefined events;
   at least one computer readable medium operatively coupled with said data storage medium; said at least one computer readable medium comprising:
      a) software configured to determine that: (i) at least one of the predefined events have occurred; and (ii) the policy holder has not elected the second conversion provision;
      b) software configured to compute a reduction of, and thereafter reduce, the first deductible amount to the intermediate deductible amount.

12. The system according to claim 11 wherein:
   the first conversion provision reduces the first deductible amount to a plurality of successive intermediate deductible amounts after the occurrence of one of the predefined events; the plurality of intermediate deductible amounts each decreasing in amount in successive order; and
   the at least one computer readable medium further comprises software configured to reduce the first deductible amount to a plurality of intermediate deductible amounts in a plurality of separate steps after the occurrence of one of the predefined events.

13. A computer implemented method for enabling a policy holder of an insurance supplement to vary provisions of the insurance supplement, the method comprising:
   at least temporarily storing on a data storage medium data relative to the insurance supplement that includes:
      (i) a deductible provision, set at a first deductible amount;
      (ii) a premium provision, set at a first premium amount;
      (iii) a first conversion provision that reduces the first deductible amount to a second deductible amount on the occurrence of one of the following predefined events that may occur after insurance coverage under the insurance supplement begins: (a) the policy holder attaining a predetermined age; or (b) a decline in the physical health of the policy holder; and
      (iv) a second conversion provision that reduces the first deductible amount to the second deductible amount and increases the first premium amount to a second premium amount after the election by the policy holder; wherein an election of the second conversion provision by the policy holder terminates the first conversion provision;
   selling the insurance supplement to the policy holder;
   receiving premiums in accordance with the insurance supplement;
   receiving a notice that at least one of the predefined events occurred to trigger the first conversion provision;
   computing a reduction of and thereafter reducing, the first deductible amount to the second deductible amount with a computing device associated with the data storage medium.

14. A computer implemented method for enabling a policy holder of an insurance supplement to vary provisions of the insurance supplement, the method comprising:
   at least temporarily storing on a data storage medium data relative to the insurance supplement that includes:

(i) a deductible provision, set at a first deductible amount;
(ii) a premium provision, set at a first premium amount;
(iii) a first conversion provision that reduces the first deductible amount to a second deductible amount on the occurrence of one of the following predefined events: (a) the policy holder attaining a predetermined age; or (b) a decline in the physical health of the policy holder; and
(iv) a second conversion provision that reduces the first deductible amount to the second deductible amount and increases the first premium amount to a second premium amount on the election of the policy holder; wherein an election of the second conversion provision by the policy holder terminates the first conversion provision;

selling the insurance supplement to the policy holder;

receiving premiums in accordance with the insurance supplement;

receiving an election by the policy holder to enact the second conversion provision;

computing a reduction of, and thereafter reducing, the first deductible amount to the second deductible amount, with a computing device associated with the data storage medium, and computing an increase of and thereafter increasing, the first premium amount to the second premium amount with the computing device.

* * * * *